US008387484B2

(12) United States Patent
Dal Pra'

(10) Patent No.: US 8,387,484 B2

(45) Date of Patent: Mar. 5, 2013

(54) GEAR-CHANGE CONTROL DEVICE FOR A BICYCLE

(75) Inventor: Giuseppe Dal Pra', Zane (IT)

(73) Assignee: Campagnolo S.r.l., Vicenza (IT)

( * ) Notice: Subject to any disclaimer, the term of this patent is extended or adjusted under 35 U.S.C. 154(b) by 199 days.

(21) Appl. No.: 11/784,650

(22) Filed: Apr. 9, 2007

(65) Prior Publication Data

US 2007/0186715 A1 Aug. 16, 2007

Related U.S. Application Data

(62) Division of application No. 10/295,095, filed on Nov. 15, 2002, now Pat. No. 7,219,573.

(30) Foreign Application Priority Data

Nov. 16, 2001 (IT) .............................. TO2001A1079

(51) Int. Cl.
*F16C 1/10* (2006.01)

(52) U.S. Cl. ...................................................... 74/502.2

(58) Field of Classification Search .................... 74/489, 74/501.6, 488, 502.2

See application file for complete search history.

(56) References Cited

U.S. PATENT DOCUMENTS

| | | | |
|---|---|---|---|
| 1,706,542 | A | 3/1929 | Pugh et al. |
| 2,384,728 | A | 9/1945 | Crumble |
| 2,586,604 | A | 2/1952 | Bennett |
| 2,770,980 | A | 11/1956 | Millward |
| 2,854,857 | A | 10/1958 | Gleasman et al. |
| 3,279,779 | A | 10/1966 | Thomas et al. |
| 3,760,648 | A | 9/1973 | Hoffman |
| 3,776,061 | A | 12/1973 | Yoshigai |
| 3,915,029 | A | 10/1975 | Shimada |
| 3,972,247 | A | 8/1976 | Armstrong |
| 4,002,350 | A | 1/1977 | Timbs |
| 4,075,871 | A | 2/1978 | Burke |
| 4,100,820 | A | 7/1978 | Evett |
| 4,319,673 | A * | 3/1982 | Kojima ........................ 192/217 |
| 4,454,784 | A | 6/1984 | Shimano |
| 4,459,871 | A | 7/1984 | Shimano |
| 4,605,240 | A | 8/1986 | Ciem et al. |
| 4,740,001 | A | 4/1988 | Torleumke |
| D298,309 | S | 11/1988 | Coue |
| 4,840,082 | A | 6/1989 | Terashima et al. |

(Continued)

FOREIGN PATENT DOCUMENTS

| | | |
|---|---|---|
| CH | 248133 | 4/1947 |
| CN | 1144761 | 3/1997 |

(Continued)

OTHER PUBLICATIONS

Chinese Office Action, Appl. No. CN 200610090826.7, dated Apr. 3, 2009.

(Continued)

*Primary Examiner* — Vicky Johnson

(74) *Attorney, Agent, or Firm* — Volpe and Koenig, P.C.

(57) ABSTRACT

A gear change control device for a bicycle having a handlebar with straight end portions, comprises a first control lever with a control portion arranged behind the end portion of the handlebar, with reference to the longitudinal direction of the bicycle, and extending at least partially at a position lying substantially at the same level of the handlebar, with respect to a vertical direction in the condition of use of the handlebar and a second control lever with a control portion arranged at the same level, below or upper the control portion of the first control lever.

31 Claims, 4 Drawing Sheets

U.S. PATENT DOCUMENTS

Figure 1:
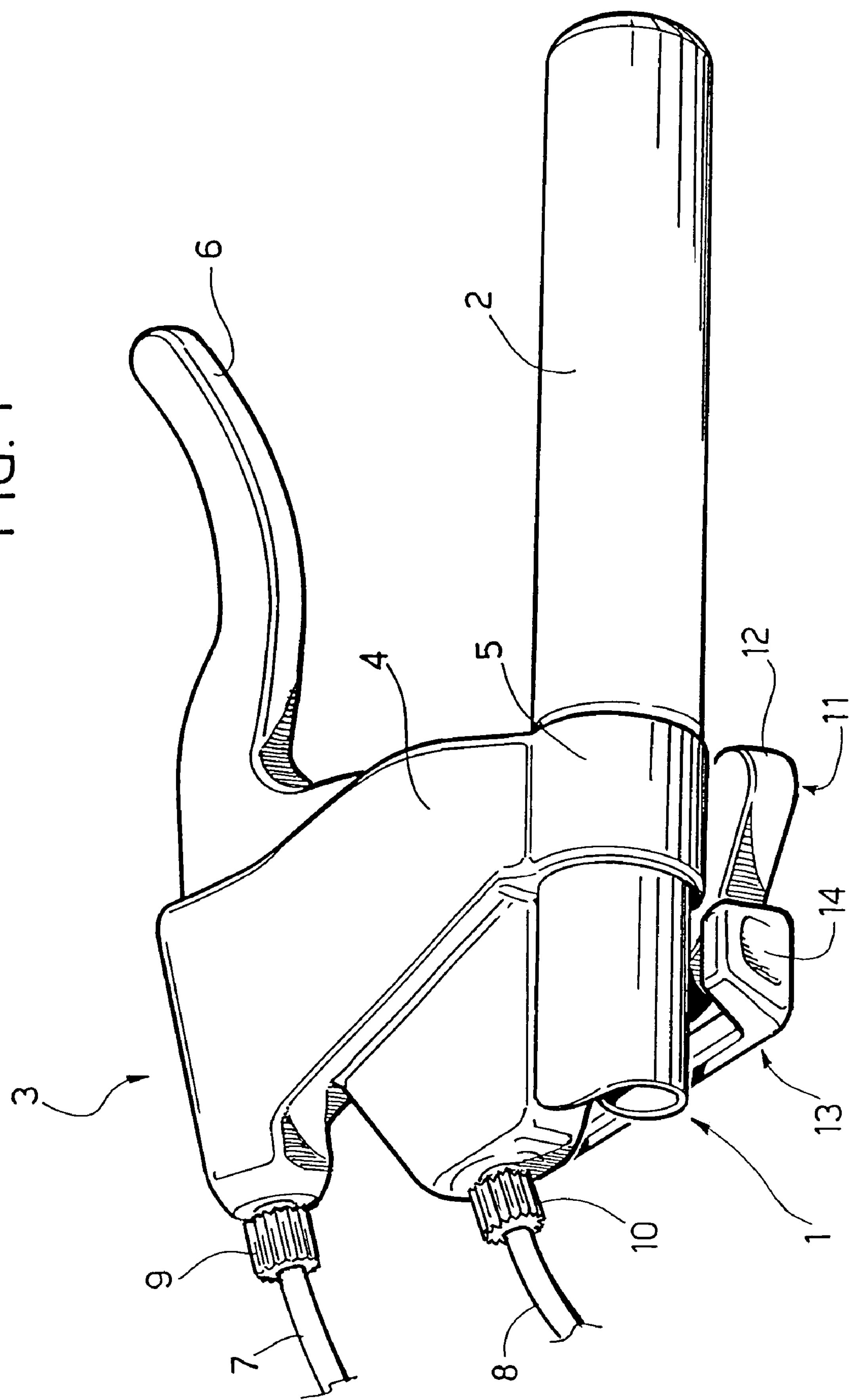

| | | | | |
|---|---|---|---|---|
| 4,885,951 | A | 12/1989 | Desenclos et al. | |
| 4,930,368 | A | 6/1990 | Nagano | |
| 4,945,785 | A | 8/1990 | Romano | |
| 4,966,046 | A | 10/1990 | Tagawa | |
| 5,012,692 | A | 5/1991 | Nagano | |
| 5,020,387 | A | 6/1991 | Nagano | |
| 5,050,444 | A | 9/1991 | Nishimura | |
| 5,094,120 | A | 3/1992 | Tagawa | |
| RE34,007 | E | 7/1992 | Desenclos et al. | |
| 5,159,851 | A | 11/1992 | Rahmes | |
| 5,186,071 | A | 2/1993 | Iwasaki | |
| 5,203,213 | A * | 4/1993 | Nagano | 74/473.14 |
| 5,213,005 | A | 5/1993 | Nagano | |
| 5,222,412 | A | 6/1993 | Nagano | |
| 5,241,878 | A | 9/1993 | Nagano | |
| 5,257,683 | A | 11/1993 | Romano | |
| 5,279,179 | A | 1/1994 | Yoshigai | |
| 5,287,765 | A | 2/1994 | Scura | |
| 5,303,608 | A | 4/1994 | Iwasaki | |
| 5,400,675 | A | 3/1995 | Nagano | |
| 5,479,776 | A | 1/1996 | Romano | |
| 5,480,356 | A | 1/1996 | Campagnolo | |
| 5,515,743 | A | 5/1996 | Lumpkin | |
| 5,528,954 | A | 6/1996 | Yoshigai | |
| 5,601,001 | A * | 2/1997 | Kawakami et al. | 74/502.2 |
| 5,676,020 | A | 10/1997 | Jordan et al. | |
| 5,676,021 | A | 10/1997 | Campagnolo | |
| 5,676,022 | A | 10/1997 | Ose | |
| 5,755,139 | A | 5/1998 | Kojima | |
| 5,787,757 | A | 8/1998 | Ozaki | |
| 5,791,195 | A | 8/1998 | Campagnolo | |
| 5,806,372 | A | 9/1998 | Campagnolo | |
| 5,832,782 | A | 11/1998 | Kawakami | |
| 5,896,779 | A | 4/1999 | Biersteker et al. | |
| 5,900,705 | A * | 5/1999 | Kimura | 318/286 |
| 5,921,140 | A | 7/1999 | Lemmens et al. | |
| 5,970,816 | A | 10/1999 | Savard | |
| 6,073,730 | A * | 6/2000 | Abe | 188/24.11 |
| 6,095,010 | A | 8/2000 | Arbeiter | |
| 6,098,488 | A | 8/2000 | Vos | |
| 6,370,981 | B2 | 4/2002 | Watarai | |
| 6,457,377 | B1 | 10/2002 | Hsu | |
| 6,502,477 | B1 | 1/2003 | Assel | |
| 6,553,861 | B2 * | 4/2003 | Ose | 74/502.2 |
| 6,564,670 | B2 | 5/2003 | Feng et al. | |
| 6,564,671 | B2 * | 5/2003 | Ose | 74/502.2 |
| 6,647,823 | B2 | 11/2003 | Tsumiyama et al. | |
| 6,792,826 | B2 | 9/2004 | Dal Pra' | |
| 7,100,471 | B2 | 9/2006 | Irie et al. | |
| 2002/0078789 | A1 | 6/2002 | Chen | |
| 2002/0104401 | A1 | 8/2002 | Dal Pra' | |
| 2002/0124679 | A1 | 9/2002 | Dal Pra' | |
| 2002/0139637 | A1 | 10/2002 | Tsumiyama et al. | |
| 2003/0094064 | A1 | 5/2003 | Dal Pra' | |
| 2003/0167871 | A1 | 9/2003 | Irie et al. | |
| 2003/0177855 | A1 | 9/2003 | Tsumiyama et al. | |
| 2004/0144193 | A1 | 7/2004 | Sato et al. | |
| 2004/0237697 | A1 | 12/2004 | Kawakami | |
| 2004/0237698 | A1 | 12/2004 | Hilsky et al. | |
| 2005/0241428 | A1 | 11/2005 | Tsai | |
| 2006/0070480 | A1 | 4/2006 | Fujii | |
| 2006/0207375 | A1 | 9/2006 | Jordan et al. | |
| 2006/0272443 | A1 | 12/2006 | Tsumiyama | |
| 2007/0034037 | A1 | 2/2007 | Dal Pra' et al. | |
| 2007/0068332 | A1 | 3/2007 | Fujii et al. | |
| 2007/0137388 | A1 | 6/2007 | Dal Pra' | |
| 2007/0137391 | A1 | 6/2007 | Fujii | |
| 2007/0178715 | A1 | 8/2007 | Fujii | |
| 2007/0186715 | A1 | 8/2007 | Dal Pra' | |
| 2007/0193386 | A1 | 8/2007 | Fujii | |
| 2007/0204716 | A1 | 9/2007 | Dal Pra' | |
| 2008/0098848 | A1 | 5/2008 | Dal Pra' et al. | |
| 2008/0196537 | A1 | 8/2008 | Dal Pra' | |
| 2008/0210041 | A1 | 9/2008 | Dal Pra' et al. | |
| 2008/0210042 | A1 | 9/2008 | Dal Pra' | |
| 2009/0025504 | A1 | 1/2009 | Dal Pra' et al. | |
| 2009/0031846 | A1 | 2/2009 | Dal Pra' et al. | |
| 2009/0133526 | A1 | 5/2009 | Dal Pra' et al. | |

FOREIGN PATENT DOCUMENTS

| | | | |
|---|---|---|---|
| CN | 2436412 | | 6/2001 |
| CN | 1443679 | | 9/2003 |
| CN | 1550405 | | 12/2004 |
| DE | 3136922 | | 3/1983 |
| DE | 3706545 | | 9/1988 |
| DE | 19607640 | | 1/1997 |
| DE | 202006006796 | | 8/2006 |
| EP | 0371254 | | 6/1990 |
| EP | 0478901 | | 4/1992 |
| EP | 0504118 | | 9/1992 |
| EP | 0504118 | A1 | 9/1992 |
| EP | 0361335 | | 2/1994 |
| EP | 0601211 | | 6/1994 |
| EP | 0601221 | | 6/1994 |
| EP | 0635422 | | 1/1995 |
| EP | 0714826 | | 6/1996 |
| EP | 0744334 | | 11/1996 |
| EP | 0790175 | | 8/1997 |
| EP | 1123861 | | 8/2001 |
| EP | 1134158 | | 9/2001 |
| EP | 1245483 | | 10/2002 |
| EP | 0785128 | | 11/2002 |
| EP | 1264765 | | 12/2002 |
| EP | 1342655 | | 9/2003 |
| EP | 1440878 | | 7/2004 |
| EP | 1449756 | | 8/2004 |
| EP | 1473220 | | 11/2004 |
| EP | 1481883 | | 12/2004 |
| EP | 1502847 | | 2/2005 |
| EP | 1535829 | | 6/2005 |
| EP | 1564131 | | 8/2005 |
| EP | 1642823 | | 4/2006 |
| EP | 1698550 | | 9/2006 |
| EP | 1739001 | | 1/2007 |
| EP | 1816066 | | 8/2007 |
| EP | 1826111 | | 8/2007 |
| FR | 960276 | | 4/1950 |
| FR | 2777528 | | 10/1999 |
| FR | 2861686 | | 2/2006 |
| GB | 615173 | | 1/1949 |
| GB | 2012893 | | 8/1979 |
| JP | 58003987 | | 6/1956 |
| JP | 51060342 | | 5/1976 |
| JP | 17893 | | 1/1982 |
| JP | 17894 | | 1/1982 |
| JP | 58030884 | A | 2/1983 |
| JP | 224879 | | 12/1983 |
| JP | 60107475 | | 6/1985 |
| JP | 157092 | | 10/1989 |
| JP | 2088384 | | 3/1990 |
| JP | 03292280 | | 12/1991 |
| JP | 04331689 | | 11/1992 |
| JP | 05097088 | A | 4/1993 |
| JP | 05082786 | | 11/1993 |
| JP | 05286476 | | 11/1993 |
| JP | 06016170 | | 1/1994 |
| JP | 07033063 | A | 2/1995 |
| JP | 07251784 | | 10/1995 |
| JP | 08328679 | A | 12/1996 |
| JP | 61241287 | | 10/2007 |
| TW | 136125 | Y | 6/1990 |
| TW | 510875 | | 11/2002 |
| TW | 519089 | | 1/2003 |
| TW | 570013 | Y | 1/2004 |
| TW | 1223636 | | 11/2004 |
| WO | 9218374 | | 10/1992 |
| WO | 03093094 | | 11/2003 |
| WO | 2005044656 | | 5/2005 |

OTHER PUBLICATIONS

Chinese Office Action, Appl. No. CN 200710005823.3, dated Sep. 25, 2009.

Chinese Office Action, Appl. No. CN 200810082341.2, dated Nov. 30, 2010.

European Search Report, Appl. No. EP 05425458.6, dated Nov. 16, 2005.

European Search Report, Appl. No. EP 05017003.4, dated Dec. 20, 2005.
European Search Report, Appl. No. 06003694.4, dated Jul. 31, 2006.
European Search Report, Appl. No. RS 144832, dated Apr. 16, 2007.
European Search Report, Appl. No. RS 115409, dated Jul. 18, 2007.
European Search Report, Appl. No. RS 115410, dated Jul. 31, 2007.
European Search Report, Appl. No. RS115682, dated Oct. 30, 2007.
European Search Report, Appl. No. 08003760.9, dated Jun. 27, 2008.
European Search Report, Appl. No. EP 08003755.9, dated Jun. 27, 2008.
European Search Report, Appl. No. EP 08022485.0, dated Jul. 2, 2009.
European Search Report, Appl. No. 08005438.0, dated Nov. 5, 2010.
Japanese Office Action, Appl. No. JP 2002-332045, dated Dec. 16, 2008.
Japanese Office Action, Appl. No. JP 2008-550914, dated May 24, 2011.
Japanese Office Action, Appl. No. 2006-176333, dated Aug. 23, 2011.
Taiwan Search Report, Appl. No. 096101651, dated Oct. 5, 2011.
Taiwan Office Action and Search Report, Appl. No. 095121477, dated Nov. 25, 2011.

* cited by examiner 6
2
12
11
5
4
14
3
13
1
9
10
7
8

GEAR-CHANGE CONTROL DEVICE FOR A BICYCLE

CROSS REFERENCE TO RELATED APPLICATION(S)

This application is a division of U.S. patent application Ser. No. 10/295,095 filed Nov. 15, 2002, which is incorporated by reference as if fully set forth.

FIELD OF INVENTION

The present invention relates generally to gear-change control devices for bicycles. The devices particularly intended for bicycles having a so-called "straight" handlebar.

BACKGROUND

In the present description and in the following claims, reference is made to straight handlebars as opposite to handlebars having dropped end portions of the type normally used in race bicycles. The straight handlebars have end handgrips extending substantially along a horizontal direction orthogonal to the longitudinal symmetry plane of the handlebar. Handlebars of this type are usually employed for example on city bicycles, mountain bikes and touring bicycles, these latter being intended as bicycles generally having the features of a race bicycle, but provided with a straight handlebar rather than a handlebar with dropped end portions.

Gear change control devices are already known, particularly for bicycles having straight handlebar, comprising a support which can be fixed to the handlebar, a first gear change control member and a second gear change control member, wherein said first control member is pivotally mounted on said support and has a control portion which, in the mounted condition of said device on said handlebar, is movable forwardly in the longitudinal direction of the bicycle from a rest position to an operative position In a first category of devices of the above indicated type, both the first and second gear change control members are arranged so as to have their respective control portions both movable below the handlebar (see for example EP 0 361 335 B1), and both arranged to be operated by the cyclist by pushing them forwardly in the longitudinal direction of the bicycle, with the thumb of the hand which grips the adjacent handgrip of the handlebar. However, some of the above mentioned known devices are not completely easy to use since, although enabling actuation of the gear change without requiring that the hand is moved away from the handgrip on the handlebar, they since involve a variation of the hand's position on the handlebar, the variation being dependent upon whether one desires to actuate the first or the second gear change control members.

A further drawback of the known devices of the above indicated type lies in the possibility that if the cyclist actuates the gear change without actually looking at it, there is the potential to actuate one control member instead of the other. On the other hand, diverting the cyclist from the road presents its only danger.

Devices are also known in which only one of the two control members is actuated by pushing it forwardly; the other control member is formed by a lever whose control end is located ahead of the handlebar with reference to the longitudinal direction of the bicycle and is actuated by pulling it backwardly. See EP-A-0 785 128.

In order to overcome all the above mentioned drawbacks, the invention provides a gear change control device comprising a support for fixing to the handlebar, a first gear change control member and a second gear change control member. The first control member is pivotally mounted on said support and has a control portion which is movable forwardly in the longitudinal direction of the bicycle from a rest position to an operative position. The control portion being arranged behind the handlebar with respect to said longitudinal direction, and extending at least partially at a position lying substantially at the same level of the handlebar, with respect to a vertical direction in the condition of use of the handlebar.

Further preferred features of the control device of the invention are specified in the annexed claims.

In the preferred embodiment, the control portions of both control members can be controlled by pushing them forwardly with the thumb and without changing the position of the hand on the handgrip of the handlebar, depending upon whether one member or the other must be actuated. It is indeed possible to reach both the control members by holding the hand in the same position and moving only the thumb.

Furthermore, since the control portion of one or both of the two control members (12 or 14) is at least partially located so that it lies substantially in the same plane as the handlebar with respect to a vertical direction (i.e. substantially neither above nor below the handlebar). This easy reference position reduces the risk that the cyclist inadvertently actuates one member instead of the other when the operation is performed without diverting the eyes away from the road.

The above mentioned first and second control members control a bicycle derailleur, which can be either the rear or front derailleur.

In one embodiment, the above mentioned first and second control members control an actuating mechanism carried by the above mentioned support and connected to the derailleur through a flexible cable.

In a variant, the above mentioned first and second control members control switches carried by said support and forming part of an electronic device controlling an actuator for the derailleur, which can be made for example according to the teachings of U.S. Pat. No. 5,480,356.

According to a further preferred feature of the invention, the above mentioned support for the gear change control device is integrated with a support to which a brake actuating lever is articulated.

In the case that the two control members control an actuating mechanism, the preferred embodiment has the first and second control members both constituted by pivotable levers which return to their rest or home position after being operated. Also in the preferred embodiment, the first control member is a release control member adapted to control a release mechanism, i.e. a mechanism which temporarily leaves a derailleur control cable free to move under the action of a spring means associated with the derailleur. Release mechanisms of this type are known, see for example GB-A-2.012.893. With this feature, the reduced operating stroke of the first control member allows it to be operated a position substantially in the plane of the handlebar. This provides the further advantage that the handlebar acts as a stop element with respect to such a control member, thus avoiding any risk of excess force being applied to the control member.

SUMMARY

A control device for changing gear positions on a derailleur. The device comprising a support body; a first gear control member pivotally mounted on the support device with a first control portion extending beyond the mounted position for the support body; a second gear control member pivotally mounted on the support device with a second control portion extending beyond the mounted position for the support body; and at least one control portion is positioned opposite the support body by a distance sufficient to permit a handlebar to pass between the one control portion and the support body.

BRIEF DESCRIPTION OF THE DRAWING(S)

Figure 2:
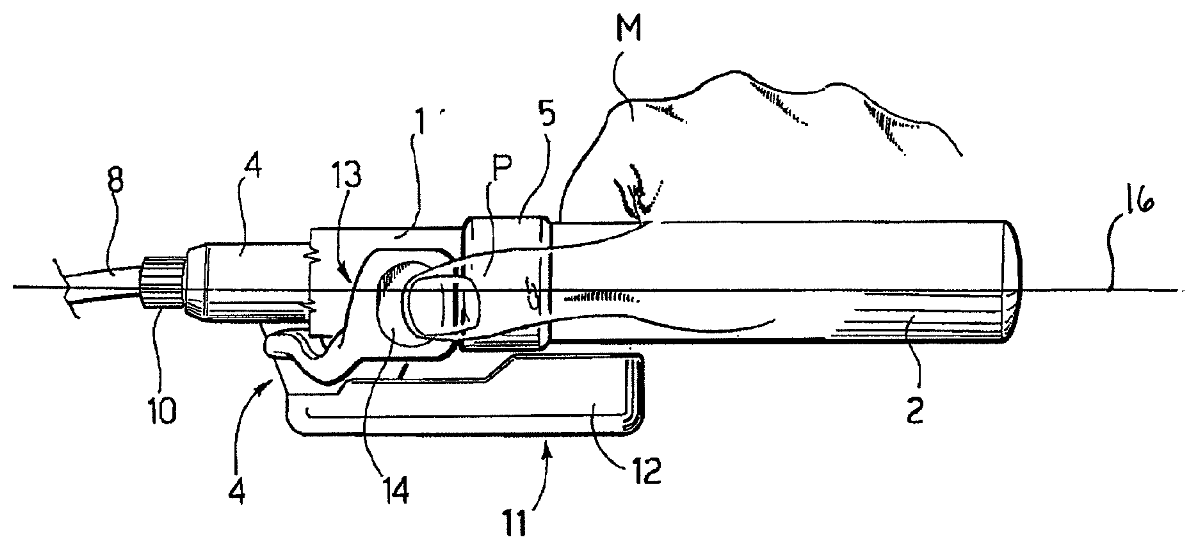
Figure 3:
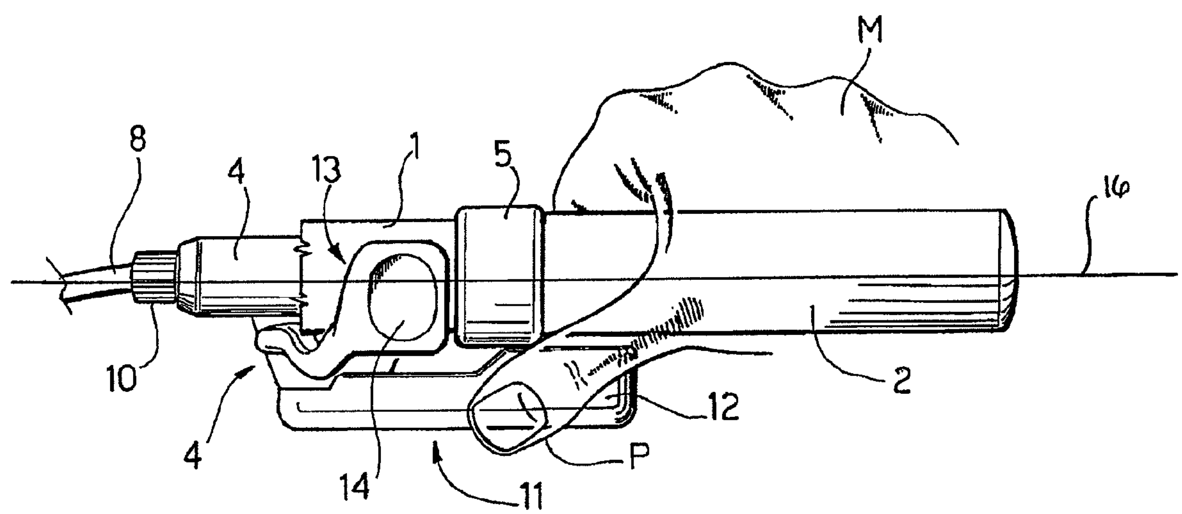
Figure 4:
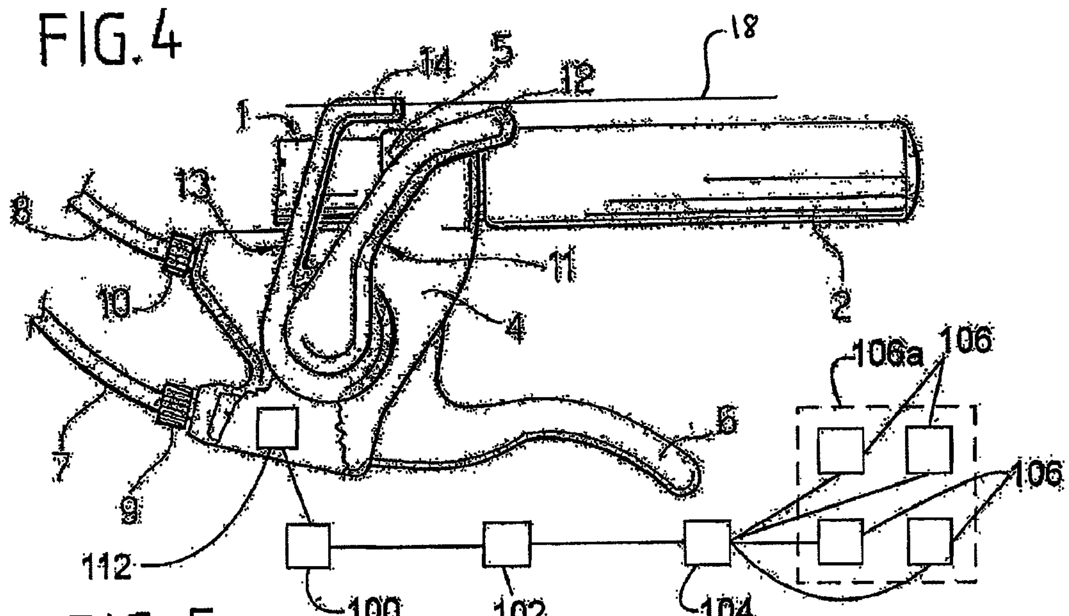
Figure 5:
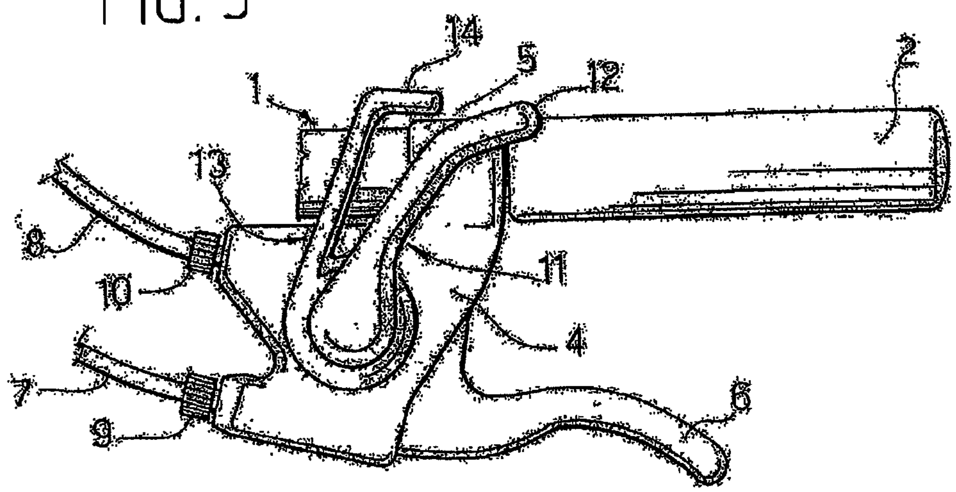
Figure 6:
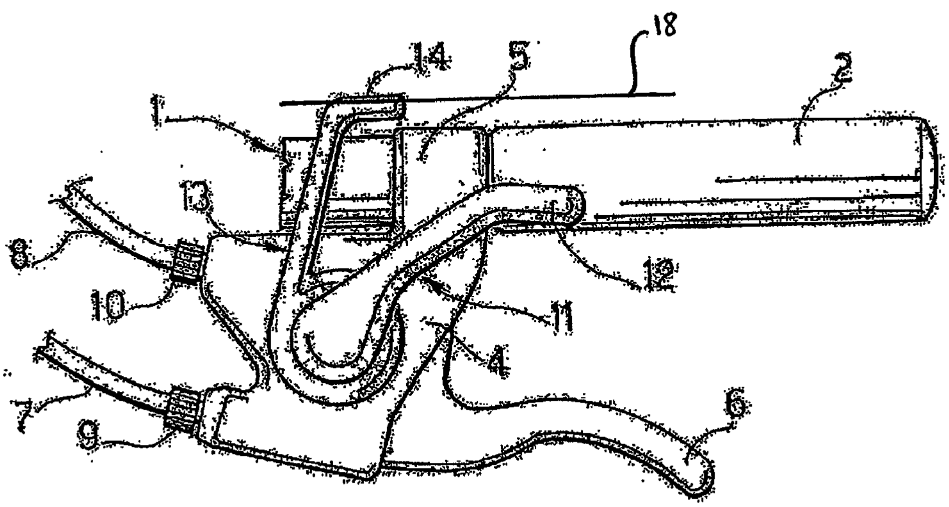
Figure 7:
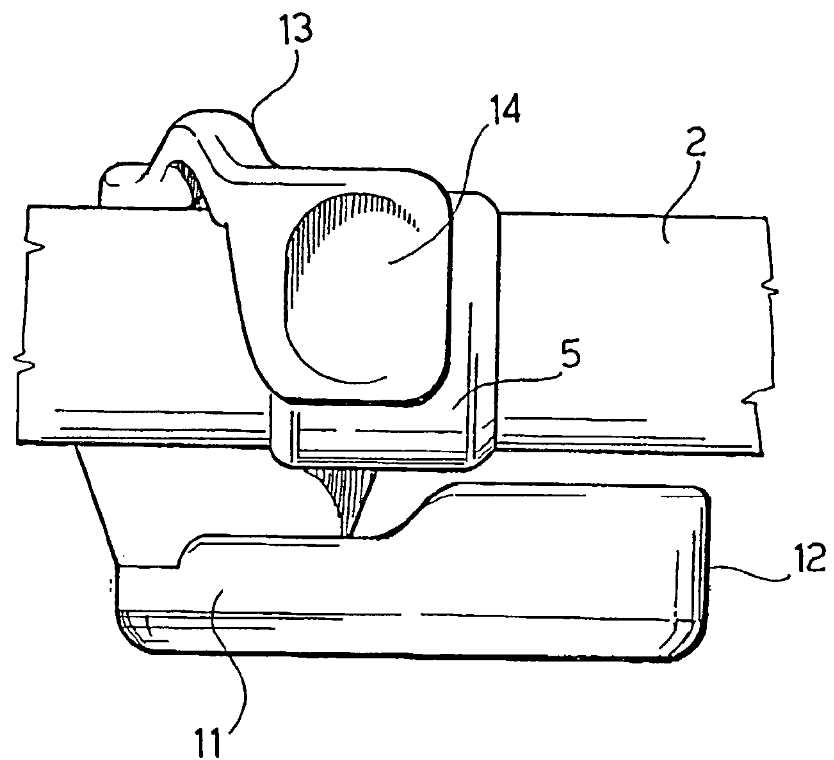
Figure 8:
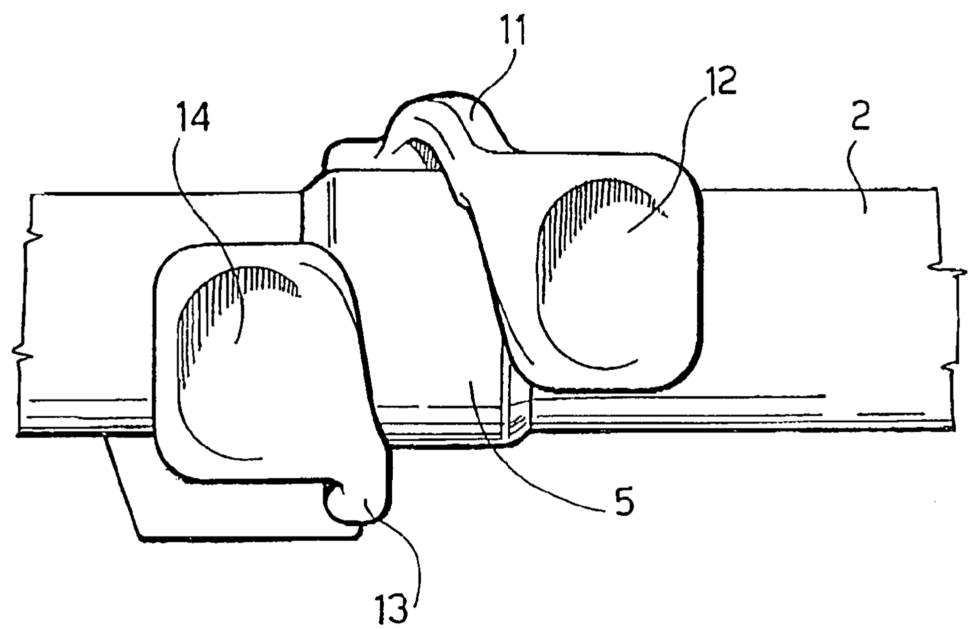

Further features and advantages of the invention will become apparent from the description which follows with reference to the following illustrative drawings, in which:

FIG. 1 is a perspective view of the invention mounted on the right hand portion of a straight handlebar, FIGS. 2 and 3 are a rear view (with reference to the direction of movement of the bicycle) of the unit of FIG. 1, which shows the possibility of actuating both control levers while holding the hand in the same position on the handgrip of the handlebar and changing only the position of the thumb, FIG. 4 is a bottom partial section view of the unit of FIG. 1, with both control levers in a neutral position, FIGS. 5 and 6 are variants of FIG. 4 which shows the operative position of the first and second control levers, and FIG. 7 illustrates and alternative embodiment, and FIG. 8 illustrates another alternative embodiment.

DETAILED DESCRIPTION OF THE PREFERRED EMBODIMENT(S)

In the drawing, reference numeral 1 indicates a right end portion of a straight handlebar of a bicycle provided with a handgrip 2. The end portion 1 has a tubular body on which an integrated unit 3 is mounted for controlling the brake and gear change. The integrated unit 3 includes a gear change control device comprising a support 4 which incorporates a clamp portion 5 connected to the handlebar 1 in a way known per se. The support 4 is used also for pivotably supporting a brake lever 6 which controls the respective brake of the bicycle by means of a flexible cable, house sheath is designated by 7.

The gear change control device controls a derailleur of the bicycle, such as the rear derailleur, by means of another flexible cable, whose sheath is designated by 8. The sheaths 7, 8 are connected in a way known per se by adjusting threaded elements 9, 10 to the body of support 4. The latter has a hollow structure and contains a mechanism for actuating the derailleur through a flexible cable which passes through sheath 8 (not shown). The actuating mechanism of the derailleur can be made in any known way. It can be controlled by a control lever 11, having an actuating end portion 12 and a control lever 13, having an actuating end portion 14. Lever 11 is used for controlling gear change by shifting the bicycle chain on the sprocket assembly associated to the rear wheel of the bicycle towards the larger sprockets. The lever 13 is instead used for controlling the gear change by chain shift towards smaller rear sprockets. In case of a front derailleur, the lever 11 causes chain shift towards larger chain-rings, whereas lever 13 causes chain shift towards smaller chain-rings.

As clearly shown in FIGS. 2, 3 both levers 11, 13 are pivotably mounted below the support 4, and below the end portion 1 of the handlebar. The lever 11 extends entirely immediately below the end portion 1, adjacent thereto, whereas the lever 13 is curved upwardly so as to have an actuating end portion 14 which is substantially facing the end portion 1 of the handlebar and is located immediately behind it, with reference to the direction of movement of the bicycle, so that the operative path of portion 14 interferes with the handlebar. The actuating portion 14 is located behind the handlebar 1, within a horizontal plane 16 intersecting the handlebar 1, such that the support 4, clamp portion 5, and actuating portion 14 are aligned within the horizontal plane 16, as shown in FIGS. 2 and 3. The actuating portion 14 extends in a direction perpendicular to the horizontal plane 16, and upward within a vertical plane 18 located behind the handlebar, as shown in FIGS. 4 and 6.

FIGS. 2, 3 clearly show how both control portions 12, 14 can be reached by the thumb P of the hand M with no need to change the position of the hand of the handgrip 2.

FIGS. 4, 5, 6 respectively show both levers in their rest position (FIG. 4), lever 13 in its operative position and lever 11 in its rest position (FIG. 5) and lever 13 in its rest position and lever 11 in its operative position (FIG. 6). Both levers 11, 13 extend from the support 4 in planes lying below the handlebar 1 and in directions generally towards the handlebar 1 when in both the rest and operative positions.

As shown, the operative stroke necessary for lever 13 is greatly reduced. As a consequence of this, lever 13 is particularly useful for temporarily releasing the mechanism in order to allow for a movement of the derailleur due to the biasing action of the spring associated thereto. Lever 11 may be provided for having a longer operative stroke for since it must causing, through the flexible cable in sheath 8, the movement of the derailleur against the action of the return spring associated thereto. In other words, the lever 13 is a lever of the so called "release" type which acts simply for temporarily unlocking the mechanism in order to allow for a movement of the derailleur under the action of its return spring. In this particular solution, the active control portion 14 can be provided immediately adjacent to the handlebar 1 which then acts as a stop element for lever 13. This prevents undesired stresses on the mechanism or on lever 13 itself, which is of particular advantageous when lever 13 is made of plastic or composite material that may be subject to the risk of ruptures when put through excessive deformation. In other applications, it is possible to leave enough space between the control portion 14 of the lever 13 and the handlebar 1 to allow the lever 13 to actuate other kinds of mechanisms when a longer stroke is useful.

Naturally, while the principle of the invention remains the same, the details of construction and the embodiments may widely vary with respect to what has been described and illustrated purely by way of example, without departing from the scope of the present invention. For example, in one embodiment, moving the gear change control members 12, 14 could contact a switch, microswitch, or actuation mechanism 112 in the support 4 that controls an electronic gear change device 100 (such as that shown in U.S. Pat. No. 5,480,356 connected to a derailleur 102 that moves a chain 104 between one of several sprockets 106 on a chain ring assembly *106a*.

For example, the levers 11, 13 can be pivotably mounted on the upper side of the support 4 that is above the end portion 1 of the handlebar. This alternative is shown in FIG. 7 where lever 11 is below the handlebar as in the case of FIGS. 1-5 and lever 13 is above the handlebar. In this embodiment, both levers can be rotated towards their operative positions in an anti-clockwise direction for a right side mount. For a left side mount, the arrangement would be reversed, with both levers rotating in a clockwise direction.

The embodiment illustrated in FIG. 8 represents a control device in which the control portions 12, 14 are both disposed so as to be substantially within the plane of the handlebar. This illustrated configuration, the control levers 11, 13 are disposed on opposite surfaces of the support 4 and the paddle or control portions 12, 14 are positioned by curve levers 11, 13 so as to be within the plane of the handlebar. In this configuration, both controls 12, 14 will have a shorter stroke than is available with the prior configurations. However, in some applications, the stroke is beneficial, especially for reducing the force on the mechanisms. In the configuration of FIG. 8, the controls 12, 14 may both be operated to the right as you look at FIG. 8, to the left as you look at FIG. 8, in opposite directions. Depending on the stroke, operation in the opposite direction will generally result in the controls 12, 14 being operated in opposite directions. However, in applications with very short strokes, it is potentially possible to operate the control portions 12, 14 toward each other or to have the levers 11, 13 of differential lengths so that the control portions pass over and under each other.

The invention claimed is:

1. A combination of a bicycle gear change control and a handlebar comprising:

a support that supports a brake lever directly in front of a handlebar of a bicycle;

a clamp attached to the support and the handlebar;

first and second gear change members which are pivotably fixed to the support and rotate about parallel planes, wherein at least one of the gear change members has a lever portion and a control portion that extends substantially perpendicularly from a terminal end of the lever portion and overlies the handlebar on an opposite side of the handlebar from the brake lever; and pivotal movement of the at least one gear change member having the control portion is impeded by the handlebar.

2. The combination according to claim 1, wherein said lever portion is pivotable in a plane adjacent to the handlebar and said control portion is substantially transverse to said plane.

3. The combination according to claim 1, wherein at least one of said gear change members pivots in a plane lying below the handlebar.

4. The combination according to claim 3, wherein said first gear change member pivots in the plane lying below the handlebar.

5. The combination according to claim 4, wherein said second gear change member pivots in the plane lying below the handlebar.

6. The combination according to claim 5, wherein each of said first and second gear change members pivots in a separate plane lying below the handlebar and said second gear change member pivots in a plane lying below the plane in which the first gear change member pivots.

7. The combination according to claim 1, wherein said control portion returns to a rest position after said control portion has been operated.

8. The combination according to claim 7, wherein said first gear change member is a release member that controls a release mechanism carried by said support.

9. The combination according to claim 7, wherein said first gear change member controls a switch that forms part of an electronic gear change.

10. The combination according to claim 1, wherein said second gear change member is pivotably mounted on said support.

11. The combination according to claim 10, wherein said second gear change member is a lever that pivots in a plane adjacent to the handlebar and has an end portion defining a control portion that moves forwardly in the longitudinal direction of the bicycle from a rest position to an operative position.

12. The combination according to claim 11, wherein said control portion of the second gear change member returns to said rest position after said control portion of the second gear change member has been operated.

13. The combination according to claim 11, wherein said control portion of the second gear change member is movable below the handlebar.

14. The combination according to claim 1, wherein each of said first and second gear change members have control portions that move in the same direction to cause a gearshift.

15. The combination according to claim 1, wherein said second gear change member is a lever pivoting within a plane lying below the handlebar, having an end portion defining a control portion movable forwardly in the longitudinal direction of the bicycle and defined by an upwardly extending end portion of said lever.

16. The combination according to claim 1, wherein said second gear change member is a lever that pivots in a plane lying below the handlebar and having an end portion defining a control portion movable forwardly in the longitudinal direction of the bicycle from a rest position to an operative position.

17. The combination according to claim 16, wherein said first gear change member controls a switch that forms part of an electronic gear change.

18. The combination according to claim 1, wherein said second gear change member controls a switch that forms part of an electronic gear change.

19. The combination according to claim 1, wherein each of said first and second gear change members have control portions that pivot in the same direction to cause a gearshift.

20. The combination according to claim 19, wherein said control portions of said first and second gear change members are positioned adjacent to each other.

21. The combination according to claim 1, wherein each of said first and second gear change members have control portions that return to a rest position after they have been operated, said control portions controlling switches that form part of an electronic gear change.

22. The combination according to claim 21, wherein said switches are carried by said support.

23. The combination according to claim 1, wherein said first and second gear change members control a bicycle derailleur that controls shifting of a bicycle chain on a bicycle multiple sprocket or chain-ring assembly.

24. The combination according to claim 23, wherein said first and second gear change members control a bicycle rear derailleur.

25. The combination according to claim 23, wherein said first and second gear change members control a bicycle front derailleur.

26. The combination according to claim 23, wherein said first and second gear change members control said derailleur through an actuating mechanism carried by said support and connected to the derailleur by means of a flexible cable.

27. The combination according to claim 1, wherein said support is integral with the brake lever.

28. The combination according to claim 1, wherein said first gear change member controls movements of a derailleur causing downward shifting of a bicycle chain.

29. The combination according to claim 1, wherein said first and second gear change members and the brake lever pivot about a common axis.

30. The combination according to claim 1, wherein the handlebar has substantially straight end portions substantially aligned along a direction parallel to a plane of symmetry of the handlebar, wherein the bicycle gear change control is mounted adjacent to one of the end portions of the handlebar.

31. The combination of claim 1 wherein the first gear change member has the control portion that overlies the handlebar and the second gear change member extends beneath the handlebar.

* * * * *